United States Patent [19]

Szantay et al.

[11] 3,755,333

[45] Aug. 28, 1973

[54] PROCESS FOR THE PREPARATION OF VINCAMINE

[75] Inventors: Csaba Szantay; Lajos Szabo; György Kalaus; Vilmos Simonidesz, all of Budapest, Hungary

[73] Assignee: Richter Gedeon Vegyeszeti Gyar RT, Budapest X, Hungary

[22] Filed: May 2, 1972

[21] Appl. No.: 249,492

[30] Foreign Application Priority Data
May 7, 1971 Hungary.................................. RI-430

[52] U.S. Cl......................... 260/293.53, 260/295 A
[51] Int. Cl............................................ C07d 27/54
[58] Field of Search................... 260/293.53, 293.55

[56] References Cited
UNITED STATES PATENTS

| | | | |
|---|---|---|---|
| 3,454,583 | 7/1969 | Kuehne............................ | 260/294.3 |
| 3,542,796 | 11/1970 | Schut................................. | 260/295 |

Primary Examiner—Henry R. Jiles
Assistant Examiner—G. Thomas Todd
Attorney—Eric H. Waters, John G. Schwartz et al.

[57] ABSTRACT

A new process for the preparation of vincamine and of homologues thereof containing acyl groups of 2 to 6 carbon atoms in the 14-position, wherein 1-ethyl-2,3,4,6,7,12-hexahydroindolo[2,3-a]quinolizine is reacted with an α-acyloxy-acrylic acid derivative of the formula

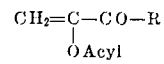

($R = C_{1-5}$ alkyl) to obtain the corresponding 1-(β-acyloxy-β-R-oxycarbonyl-ethyl)-1-ethyl-1,2,3,4,6,7-hexahydro-12H-indolo[2,3-a]quinolizine compound, this is converted by deacylation and reduction into the corresponding 1-(β-hydroxy-β-R-oxycarbonyl-ethyl)-1-ethyl-1,2,3,4,6,7,12,12b-octahydroindolo[2,3-a]quinolizine; the latter is treated with an oxidizing agent to yield a mixture of the desired vincamine derivative and the 14-epimer thereof. The latter can be epimerized in a known manner; by using silver carbonate as oxidizing agent, the epimerization occurs simultaneously.

6 Claims, No Drawings

PROCESS FOR THE PREPARATION OF VINCAMINE

This invention relates to a process for the preparation of vincamine and related compounds having the general formula (I)

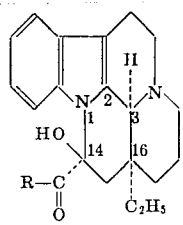

(I)

wherein R represents a $C_{1-5}$ alkoxy group, or the R-CO-group represents a reactive group which may be converted into an alkoxycarbonyl radical. More particularly, this invention relates to the synthesis of vincamine and related compounds having the general formula (I) from novel intermediate compounds. Also these novel intermediate compounds used as starting substances in the process of the invention possess biological activity, e.g. they have a vasodilatory effect.

It is known that (+)-vincamine occurring in nature is an important therapeutic agent, since it has sedative and antihypertensive effects [L.Szporny, and K.Szasz: Arch. Exp. Path. Pharmac. 236 296(1959)]. It is also known that the demands for (+)-Vincamine are so high that they cannot be satisfied by procedures based on the extraction of the plant Vinca minor L.

Two syntheses have been described so far for the preparation of (+)-vincamine.

According to one of these known methods, a lactam ester prepared from triptamine and 4-ethyl-4-formyl-dimethyl-pimelate is reacted with phosphorous pentasulfide, thereafter the obtained thiolactam ester is desulphurated, the formed amino ester is oxidized, finally it is converted to (+)-vincamine by treating it with an acid (U.S. Pat. No. 3,454,583).

According to the second known method, the eight-membered ring of the corresponding precursor compound is split in alkaline medium, the obtained compounds are reacted with diazomethane, and the formed hydroxy ester is oxidized with a mixture of dimethyl-sulfoxide, triethylamine, pyridine-sulfur trioxide and water to yield (+)-vincamine [Chem. Comm. 1490 (1-969)].

The common disadvantage, however, of these syntheses is that they start from expensive, not easily available substances, moreover the methods require complicated chromatographical separation and (+)-vincamine can be obtained only with very low yields. A further disadvantage of these known processes is that they are not stereo-specific and the papers cited alone described only the preparation of racemic vincamine.

Utilizing the process of the invention, the above disadvantages can be overcome and vincamine can be prepared from easily available substances with excellent yield. By the proper selection of the reagents and the reaction conditions, an optically active product free of isomeric derivatives (e.g. 1,4-epivincamine) can be obtained as end-product of the synthesis.

We have found that vincamine and related compounds of the general formula (I) can be prepared in a very pure state, free of isomeric by-products and with excellent yields, if the easily available 1-ethyl-2,3,4,6,7,12-hexahydroindolo[2,3-a]quinolizine of the formula (II) ]J. Am. Chem. Soc. 87, 1580 (1965)] is used as starting material. According to the process of the invention, vincamine and related compounds of the general formula (I) are prepared by the following reaction steps:

a. 1-Ethyl-2,3,4,6,7,12-hexahydroindolo[2,3-a]-quino-lizine of the formula (II)

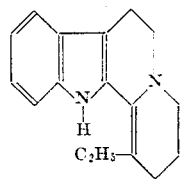

(II)

is reacted with an α-acyloxyacrylic acid derivative of the general formula (III)

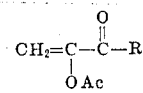

(III)

— wherein R represents a $C_{1-5}$ alkoxy group, or the R-CO- the R-CO- group represents a reactive group which may be converted into an alkoxycarbonyl radical, preferably an acid amide or a nitrile group and Ac represents an acyl radical derived from a lower aliphatic or aromatic carboxylic acid or from an alkyl- or arylsulfonic acid -, b. the obtained compound of the general formula (IV)

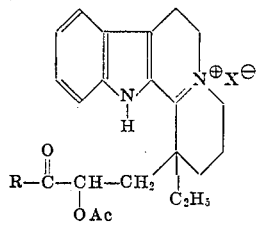

(IV)

— wherein R and Ac have the same meanings as stated above and $X^-$ represents an inorganic anion, preferably perchlorate ion— or the corresponding free base is $b_1$. reduced and the obtained compound of the general formula (V)

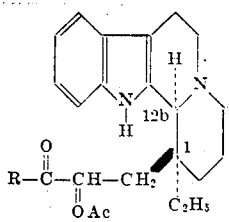

(V)

— wherein R and Ac have the same meanings as defined above — or a salt thereof is reacted with an deacylating agent to form a compound of the general formula (VII)

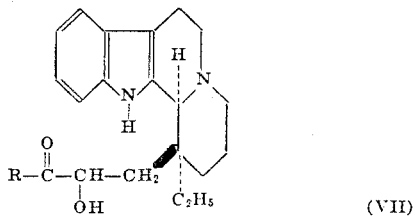

(VII)

— wherein R has the same meanings as stated above —, or b₂. deacylated, and the obtained compound of the general formula (VI)

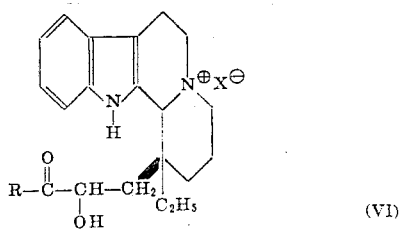

(VI)

— wherein R and X⁻ have the same meanings as defined above — is reduced, c. the obtained compound of the general formula (VII) — wherein R has the same meanings as stated above — c₁. is converted with an oxidizing agent to a mixture of epivincamine and vincamine or to a mixture of compounds of the general formulae (I) and (VIII)

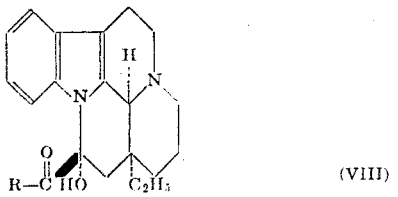

(VIII)

— wherein R has the same meanings as stated above —, and epivincamine or a related compound of the general formula (VIII) is epimerized in a manner known per se, or c₂. is reacted with silver carbonate to form vincamine or a related compound of the general formula (I) — wherein R has the same meanings as stated above —, and if necessary, the reactive group of a compound obtained in any step of the synthesis is converted to an alkoxycarbonyl group containing a C₁₋₅ alkyl moiety, and if desired (+)-vincamine or the related compound of the general formula (I) is resolved to yield the corresponding optically active antipodes.

The process of the invention is preferably carried out as follows:

1-Ethyl-2,3,4,6,7,12-hexahydro-indolo[2,3-a]quinolizine of the formula (II) is dissolved in an appropriate solvent, and an α-acyloxy-acrylic acid derivative of the general formula (III) is added to the solution. The reaction mixture is allowed to stand, thereafter the solvent is distilled off in vacuo, and the compound of the general formula (IV) is isolated from the residue in the form of a salt thereof, e.g. in the form of the corresponding perchlorate.

Thereafter the compound of the general formula (IV) — which also possess biological activity — or the corresponding free base is reduced. This process is preferably carried out in methanol solution. As reducing agent, hydrogen is used in the presence of palladium catalyst. The reaction is continued until the calculated amount of hydrogen is absorbed. During this procedure a new compound of the general formula (V) is formed, which also possess biological activity. The compounds of the general formula (V) can also be prepared by reducing the corresponding compounds of the general formula (IV) with a reducing agent other than hydrogen, e.g. with an alkali borohydride. If the reduction is carried out by catalytic hydrogenation or if an alkali borohydride is used as reducing agent, a stereospecific reaction takes place and compounds of the general formula (V), wherein the ethyl group in position 1 and the hydrogen atom in position 12b on the D ring are cis configuration, are formed.

The obtained compound of the general formula (V) may be deacylated by dissolving the compound in an acidic solvent, preferably in methanol containing hydrochloric acid and boiling the solution. The separated hydrochloric acid salt of the compound of the general formula (VII) — which latter also possess biological activity — is filtered off, washed and dissolved in an appropriate solvent, preferably in aqueous acetone. The obtained solution is rendered alkaline and the compound of the general formula (VII) is separated. The compound of the general formula (V) may also be treated with sodium methoxide in the presence of a solvent, e.g. in methanol to yield a compound of the general formula (VII).

The compounds of the general formula (VII) may also be prepared as follows: a compound of the general formula (IV), or the corresponding free base is deacylated — preferably with hydrochloric acid in methanol — and the thus obtained compound of the general formula (VI), which also possesses biological activity, is reduced to a compound of the general formula (VII). The reduction may be carried out as described at the preparation of the compounds having the general formula (V). As reducing agent, e.g. an alkali borohydride or other reducing agents may be used, or the compounds of the general formula (VI) may be reduced with hydrogen in the presence of a catalyst. If the reduction is carried out by catalytic hydrogenation or if an alkali borohydride is used as reducing agent, a stereospecific reaction takes place.

The compounds of the general formula (VII) may be oxidized to a mixture of vincamine and epivincamine or to a mixture of compounds of the general formulae (I) and (VIII), respectively. The reaction is preferably carried out as follows: a compound of the general formula (VII) is dissolved in an appropriate solvent, e.g. in dimethylsulfoxide, and a solution of phosphoric acid in dimethylsulfoxide is added to the former solution. Thereafter freshly distilled dicyclohexyl carbodiimide is added dropwise to the reaction mixture, and the mixture is allowed to stand. After several hours of standing the mixture is poured onto ice, the solution is rendered alkaline, and the mixture is extracted with an appropriate solvent, preferably with dichloromethane. The dichloro-methane solution is dried and the solvent is evaporated in vacuo. The obtained residue is a mixture of (+)-vincamine and (+)-epivincamine or a mixture of compounds of the general formulae (I) and (VIII), respectively. The residue is crystallized from an appropriate solvent, preferably from a mixture of methanol and ether to yield (+)-vincamine or related compounds of the general formula (I). According to an other method the residue is not crystallized but it is subjected to epimerization as described in the British Patent application No. 3283/72 to yield (+)-vincamine or related compounds of the general formula (I).

According to another preferred method of the invention a compound of the general formula (VII) is oxidized in benzene medium preferably with silver carbonate. The reaction is carried out at the boiling point of the reaction mixture. The solvent is evaporated in vacuo to yield a residue which is a mixture of (+)-vincamine and (+)-epivincamine or a mixture of compounds of the general formulae (I) and (VIII), respectively. This mixture is worked up as described above.

According to a particularly preferred method of the invention the oxidation of the compounds of the general formula (VII) and the subsequent epimerization of the products may be carried out in a single step. In this case the reaction is carried out with silver carbonate, but benzene is replaced by another inert solvent or solvent mixture. As solvent, e.g. benzene-type hydrocarbons or their mixtures may be used. A particularly preferred solvent is xylene. The xylene solution is evaporated to about 20 percent of the original volume under reduced pressure. This operation is carried out under nitrogen atmosphere. The residual concentrate is allowed to stand, the separated crystals are filtered off, washed and dried. In this way (+)-vincamine or related compounds of the general formula (I) are obtained.

According to a method of the invention the $C_{1-5}$ alkoxy group of the compounds of the formulae (I), (IV), (V), (VII) or (VIII) is introduced into the molecule after any of the synthesis steps by methods known per se.

(+)-Vincamine or related compounds having the general formula (I) may be resolved using O,O'-dibenzoyl tartaric acid, d-tartaric acid, d-camphorsulfonic acid or other optically active acids. The optically active end-products may also be formed by resolving any of the racemic intermediates produced in the synthesis and carrying out the subsequent steps with the optically active compounds.

The invention is further elucidated by the aid of the following non-limiting Examples.

EXAMPLE 1

PREPARATION OF (+)-VINCAMINE a. Preparation of 1-($\beta$-acetoxy-$\beta$-methoxycarbonyl-ethyl)-1-ethyl-1,2,3,4,6,7-hexahydro-12H-indolo[2,3-a]quinolizine perchlorate (Formula IV, R = methoxy group, Ac = acetyl group, $X^-$ = perchlorate ion)

7.09 g. (2.8 mmoles) of 1-ethyl-2,3,4,6,7,12-hexahydro-12H-indolo[2,3-a]quinolizine (compound of the formula II) are dissolved in 100 ml. of dry dichloromethane. 10 ml. of $\alpha$-acetoxy-acrylic acid methyl ester are added to the solution and the reaction mixture is allowed to stand at room temperature for 2 days. Dichloromethane is evaporated in vacuo, the dark, oily residue is triturated with 3×50 ml. of petroleum ether, dissolved in 20 ml. of methanol, and the solution is acidified to pH = 5 with 70 percent perchloric acid. This latter operation is carried out with cooling. The separated 1-($\beta$-acetoxy-$\beta$-methoxy-carbonyl-ethyl)-1-ethyl-1,2,3,4,6,7-hexahydro-12H-indolo[2,3-a]quinolizine perchlorate is filtered off and washed with cold methanol and with ether. 7.00 g. of the product are obtained (yield = 50 percent); m.p.: 152°–154 °C.

Analysis:

Calculated for $C_{23}H_{29}N_2O_8Cl$ (496.93):
  C = 55.56 %   H = 5.88 %   N = 5.54 %
Found:  C = 55.40 %   H = 5.60 %   N = 5.90 %

IR-spectrum: $\nu_{max}$ = 3,600 (OH), 3,500 (NH), 1,730 ($CO_2CH_3$)m 1,760 ($COOCH_3$), 1,630, 1,538 (C = N) $cm^{-1}$.

b. Preparation of 1-($\beta$-acetoxy-$\beta$-methoxycarbonyl-ethyl)-1-ethyl-1,2,3,4,6,7,12,12b-octahydro-indolo[2,3-a]quinolizine (Formula V, R = methoxy group, Ac = acetyl group)

$b_1$. 7.50 g. of 1-($\beta$-acetoxy-$\beta$-methoxycarbonyl-ethyl)-1-ethyl-1,2,3,4,6,7-hexahydro-12H-indolo[2,3-a]quino-lizine perchlorate are dissolved in 350 ml. of methanol, and 4.5 g. of 10 percent palladium-on-carbon are added to the solution. The reaction mixture is hydrogenated. The mixture absorbs the calculated amount of hydrogen within about 2 hours. The mixture is filtered and the filtrate is evaporated. 7 g. of 1($\beta$-acetoxy-$\beta$-methoxycarbonyl-ethyl)-1-ethyl-1,2,3,4,6,7,12,12b-octahydroindolo[2,3-a]qui-nolizine perchlorate are obtained, which may be used in the next step without purification.

1 g. of 1-($\beta$-acetoxy-$\beta$-methoxycarbonyl-ethyl)-1-ethyl-1,2,3,4,6,7,12,12b-octahydroindolo[2,3-a]quinolizine perchlorate are dissolved in 5 ml. of 80 percent aqueous acetone, and the solution is alkalinized with ammonium hydroxide to pH = 8. The separated crystalline 1-($\beta$-acetoxy-$\beta$-methoxycarbonyl-ethyl)-1-ethyl-1,2,3,4,6,7,12,12b-octahydroindolo[2,3-a]quinolizine melts at 144 °C after recrystallization from methanol.

Yield: 0.67 g.

Analysis:

Calculated for $C_{23}H_{30}N_2O_4$ (398.49):
  C = 69.32 %   H = 7.58 %   N = 7.03 %
Found:  C = 69.58 %   H = 7.77 %   N = 7.06 %

IR-spectrum: $\nu_{max}$ = 3,410 (NH), 1,720 ($CO_2CH_3$), 1,760 ($OCOCH_3$) $cm^{-1}$.

$b_2$. 1 g. of 1-($\beta$-acetoxy-$\beta$-methoxycarbonyl-ethyl)-1-ethyl-1,2,3,4,6,7-hexahydro-12H-indolo[2,3-a]quinolizine perchlorate are suspended in 100 ml. of methanol, and 0.7 g. of sodium borohydride are added to the suspension under cooling in ice water. During the addition the reaction mixture is vigorously stirred. After 10 minutes the mixture is acidified to pH = 6 with glacial acetic acid, and the mixture is evaporated to dryness in vacuo. The residue is partitioned between 5 percent aqueous sodium hydrocarbonate solution and ether. The ethereal layer is dried and evaporated to dryness. The residue is recrystallized from methanol. In this way 0.5 g. of 1-($\beta$-acetoxy-$\beta$-methoxycarbonyl-ethyl)-1-ethyl-1,2,3,4,6,7,12,12b-octahydroindolo[2,3-a]quinolizine are obtained.

c. Preparation of 1-($\beta$-hydroxy-$\beta$-methoxycarbonyl-ethyl)-1-ethyl-1,2,3,4,6,7-hexahydro-12H-indolo[2,3-a]quinolizine perchlorate (Formula VI, R = methoxy group, $X^-$ = perchlorate ion)

0.3 g. of 1-($\beta$-acetoxy-$\beta$-methoxycarbonyl-ethyl)-1-ethyl-1,2,3,4,6,7-hexahydro-12H-indolo[2,3-a]quinolizine perchlorate(prepared as described in paragraph (a.) are dissolved in 10 ml. of methanol containing 0.165 g. of hydrochloric acid per ml. The solution is boiled for 2 hours, thereafter it is evaporated to dryness. The residue is dissolved in water and 70 percent aqueous perchloric acid is added to the solution. 0.2 g. of 1-($\beta$-hydroxy-$\beta$-methoxycarbonyl-ethyl)-1-ethyl-1,2,3,4,6,7-hexahydro-12H-indolo[2,3-a]quinolizine-perchlorate are obtained; m.p.: 180°–181 ° C.

Analysis:
Calculated for $C_{21}H_{27}N_2O_7Cl$ (454.90):
C = 55.44 %  H = 5.81 %  N = 6.15 %
Found:  C = 55.49 %  H = 5.98 %  6.08 %

IR spectrum: $\nu_{max}$: 3,450 (NH), 3,360 (OH), 1,718 ($COOCH_3$), 1,620, 1,535 (C=N), 1,442, 1,100 $cm^{-1}$.

d. Preparation of 1-($\beta$-hydroxy-$\beta$-methoxycarbonyl-ethyl)-1-ethyl-1,2,3,4,6,7,12,12H-octahydroindolo[2,3-a]quinolizine (Formula VII, R = methoxy group)

$d_1$. 7 g. of 1-($\beta$-acetoxy-$\beta$-methoxycarbonyl-ethyl)-1-ethyl-1,2,3,4,6,7,12, 12b-octahydroindolo[2,3-a]quinolizine perchlorate are dissolved in 150 ml. of methanol containing 0.165 g. of hydrochloric acid per ml., and the solution is refluxed for 2 hours. Thereafter the solution is evaporated in vacuo to 30 ml. The separated salt is filtered off and washed with cold methanol and ether. The obtained 5.5 g. of the salt are dissolved in a mixture of 80 ml. of acetone and 80 ml. of water, and the solution is alkalinized with 5 percent aqueous sodium carbonate solution. The separated white, crystalline 1-($\beta$-hydroxy-$\beta$-methoxy-carbonyl-ethyl)-1-ethyl-1,2,3,4,6,7,12,12b-octahydroindolo[2,3-a]quinolizine is separated by filtration and washed with water. 4.3 g. (80 percent) of the desired product are obtained; m.p.: 234 ° C.

Analysis:
Calculated for $C_{21}H_{28}N_2O_3$ (356.45):
C = 70.75 %  H = 7.91 %  N = 7.86 %
Found: C = 70.47 %  H = 7.92 %  N = 8.14 %

IR-spectrum: $\nu_{max}$: 3,420 (OH, NH), 1,742 ($CO_2CH_3$), 1,200, 1,130, 745 $cm^{-1}$.

$d_2$. 1 g. of 1-($\beta$-acetoxy-$\beta$-methoxycarbonyl-ethyl)-1-ethyl-1,2,3,4,6,7,12,12b-octahydroindolo[2,3-a]quino-lizine perchlorate are added with 30 ml. of methanolic sodium methoxide solution (containing 0.18 g. of sodium per 100 ml. of methanol), and the mixture is boiled for 40 minutes. The sodium methoxide is decomposed with glacial acetic acid and the solution is evaporated to dryness in vacuo. The residue is suspended in 5 percent aqueous sodium hydrocarbonate solution, and the suspension is extracted with dichloromethane. The dichloromethane solution is dried over magnesium sulfate and the solvent is evaporated. 0.73 g. of 1-($\beta$-hydroxy-$\beta$-methoxycarbonyl-ethyl)-1-ethyl-1,2,3,4,6,7,12,12b-octahydroindolo[2,3-a]quinolizine are obtained; m.p.: 234 ° C.

$d_3$. 1 g. of 1-($\beta$-hydroxy-$\beta$-methoxycarbonyl-ethyl)-1-ethyl-1,2,3,4,6,7-hexahydro-12H-indolo[2,3-a]quinolizine perchlorate are dissolved in 50 ml. of methanol, and the mixture is hydrogenated in the presence of 0.6 g. of 10 percent palladium-on-carbon. The catalyst is removed by filtration and the filtrate is evaporated to dryness. The residue is treated with sodium carbonate as described in paragraph $d_1$. 0.63 g. of 1-($\beta$-hydroxy-$\beta$-methoxycarbonyl-ethyl)-1-ethyl-1,2,3,4,6,7,12,12b-octahydroindolo[2,3-a]quinolizine are obtained.

e. Preparation of vincamine and 16-epivincamine (Formulae I and VIII, R = methoxy group)

$e_1$. 1.00 g. (2.8 mmoles) of 1-($\beta$-hydroxy-$\beta$-methoxycarbonyl-ethyl)-1-ethyl-1,2,3,4,6,7,12,12b-octahydroindolo[2,3-a]quinolizine are dissolved in a mixture of 13 ml. of dry dimethyl sulfoxide and 4 ml. of a 1 m. solution of phosphoric acid in dimethylsulfoxide. When the total amount of the solid entered into solution, the solution is added with 1.66 g. of freshly distilled dicyclohexyl carbodiimide, and the reaction mixture is allowed to stand at room temperature for 7 hours. Thereafter the mixture is poured into 130 ml. of ice water, the mixture is rendered alkaline with 5 percent aqueous sodium carbonate solution, finally it is extracted with dichloromethane. The dichloromethane solutions are combined, dried over magnesium sulphate, and the solvent is evaporated in vacuo. 0.25 g. of residue are obtained. The residue is a mixture of (+)-vincamine and (+)-epi-vincamine.

The residue is recrystallized from a 1:1:1 mixture of dichloromethane, methanol and diethyl ether. 0.095 g. of (+)-vincamine are obtained; m.p.: 224°–225 ° C.

The mother liquor obtained in the above process is evaporated to yield 0.098 g. of a mixture of epivincamine and vincamine. This mixture is recrystallized from methanol to yield 0.072 g. of pure (+)-epivincamine. M.p.: 210 ° C.

IR spectrum: $\nu_{max}$: 1,756 ($CO_2CH_3$), 1,462, 1,370, 1,330, 1,310, 1,258, 1,240, 1,200, 1,188, 1,088, 1,060, 1,020, 810, 756 $cm^{-1}$.

$e_2$. 0.1 g. of 1-($\beta$-hydroxy-$\beta$-methoxycarbonyl-ethyl)-1-ethyl-1,2,3,4,6,7,12,12b-octahydroindolo[2,3-a]quinolizine are dissolved in 10 ml. of benzene. 1.5 g. of silver carbonate - celite reagent (containing 50 percent of silver carbonate) are added, and the mixture is boiled for 48 hours. The mixture if filtered, the benzene filtrate is evaporated in vacuo. The 0.095 g. of residue is a mixture of (+)-vincamine and (+)-epivincamine. The mixture is subjected to fractional crystallization (solvent: 1:1 mixture of dichloromethane and methanol) to yield 0.015 g. of (+) -epivincamine.

f. Preparation of (+)-vincamine (Formula I, R = methoxy group)

$f_1$. 1 g. of a mixture of (+)-vincamine and (+)-epivincamine (prepared as described in paragraph e) are dissolved in 100 ml. of xylene and 7.5 g. of silver carbonate - celite reagent (containing 50 percent of silver carbonate) are added to the solution. The reaction mixture is boiled for about 3 to 4 hours. The conversion is monitored by thin layer chromatography. At the end of the boiling the mixture is filtered, the filter cake is washed with hot xylene, the xylene solutions are combined and evaporated in vacuo to about 20 percent of the original volume. This operation is carried out under a nitrogen atmosphere. The concentrate is left to stand for 1 day. Next day the separated crystals are filtered off, washed and dried. 0.8 g. of (+)-vincamine are obtained; m.p.: 227°–228 ° C.

$f_2$. 2.0 g. of 1-($\beta$-hydroxy-$\beta$-methoxycarbonyl-ethyl)-1,2,3,4,6,7,12,12b-octahydroindolo[2,3-a]qui-nolizine (prepared as described in paragraph d) are dissolved in 100 ml. of xylene, the solution is heated to boiling; and 10.0 g. of silver carbonate - celite reagent (containing 50 percent of silver carbonate) are added to the hot solution with constant stirring. The reaction mixture is boiled for 5 hours. The progress of the conversion is monitored by thin layer chromatography. Thereafter the xylene mixture is filtered hot, the filtrate is cooled on a mixture of salt and ice, and after several hours the separated crystalline (+)-vincamine is filtered off. Yield: 1.44 g. (75 %). M.p.: 225 ° C.

The xylene mother liquor is evaporated to one-third of its original volume and the concentrate is cooled. A further 0.16 g. of crystalline substance is obtained (total yield: 80 %), this second crop may be, however, a mixture of (+)-vincamine and (+)-epivincamine. This latter fraction is either recrystallized or used in the former oxidation step as starting substance.

g. Preparation of (+)-vincamine g₁. 0.3 g. of (+)-vincamine and 0.3 g. of 0.0'-dibenzoyl tartaric acid are dissolved in 6 ml. of hot methanol. If necessary, the mixture is filtered hot. The solution is allowed to cool and seeded with a crystal of (+)-vincamine 0,0'-dibenzoyl tartrate (m.p.: 205 ° C). The mixture is allowed to stand at room temperature for two days, thereafter the separated crystals are collected by filtration and washed with cold methanol. Yield: 0.15 g. (50 percent). M.p.: 205 ° C.

The thus-obtained salt is treated with 5 percent aqueous sodium carbonate solution. The free base is extracted with dichloromethane. The dichloromethane solution is dried and evaporated. 0.08 g. of (+)-vincamine are obtained, m.p.: 228 ° C $(\alpha)_D^{22} = +41.32°$ (c = 1, pyridine).

g₂. The process described in paragraph g₁ is repeated with the difference that d-tartaric acid is used as resolving agent. (+)-Vincamine tartrate melts at 218 ° C. The yield and the optical purity grade of (+)-vincamine obtained in this process is the same as given in paragraph g₁.

g₃. The process described in paragraph g₁ is repeated with the difference that d-camphorsulfanic acid is used as resolving agent. (+)-Vincamine d-camphorsulfonate melts at 130 ° C (the substance crystallizes with methanol). The yield and the optical purity grade of (+)-vincamine obtained in this process is the same as given in paragraph g₁.

EXAMPLE 2

The ethyl analogue of (+)-vincamine
(Formula I, R = ethoxy group)

The process described in Example 1 is repeated with the difference that α-acetoxy-acrylic acid methyl ester is replaced by α-acetoxy-acrylic acid ethyl ester.

The ethyl-analogue of (+)-vincamine (Formula I, R = ethoxy group) melts at 245 ° C. $(\alpha)_D^{22} = 64.1°$ (c = 1, pyridine).

EXAMPLE 3

Preparation of 1-(β-hydroxy-β-methoxycarbonyl-ethyl)-1-ethyl-1,2,3,4,6,7-hexahydro-12H-indolo [2,3-a]qui-nolizine perchlorate (Formula VI, R = methoxy group, X⁻ = perchlorate ion)

The process described in Example 1, paragraph a. is repeated with the difference that α-acetoxy-acrylic acid methyl ester is replaced by α-acetoxy-acrylonitrile. The oily residue obtained after the evaporation of dichloromethane is purified through the perchlorate salt. The purified substance is boiled in methanol containing hydrochloric acid until the nitrile and amide bands disappear in the infrared spectrum of the mixture. Thereafter the solution is worked up as described in Example 1, paragraph c. 1-(β-Hydroxy-β-methoxycarbonyl-ethyl)-1-ethyl-1,2,3,4,6,7-hexahydro-12H-indolo [2,3-a]quinolizine perchlorate is obtained. The product is identical with the compound obtained in Example 1, paragraph c.

What we claim is:

1. A process for the preparation of compounds of the formula I

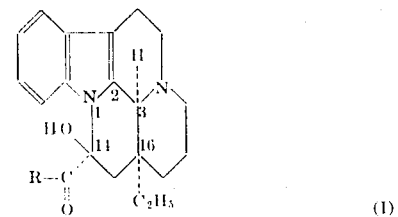

— wherein

represents an alkoxycarbonyl radical of 2 to 6 carbon atoms or a reactive group convertible into the said alkoxycarbonyl radical, characterized in that a. 1-ethyl-2,3,4,6,7,12-hexahydroindolo[2,3-a]quinolizine of the formula II

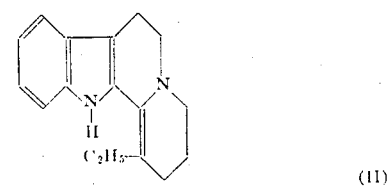

is reacted with an α-acyloxy-acrylic acid derivative of the formula III

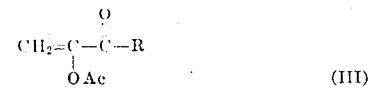

— wherein R has the same meanings as above the Ac represents an acyl radical b. the obtained compound of the general formula IV

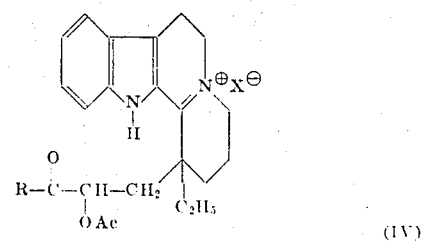

wherein R and Ac have the same meanings as above and X⁻ represents an inorganic anion, or the corresponding free base is reduced, c. the obtained compound of the formula V

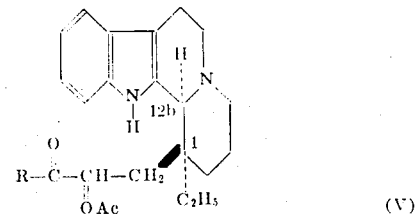

wherein R and Ac have the same meanings as above, or a salt thereof is reacted with a deacylating agent to form a compound of the general formula VII

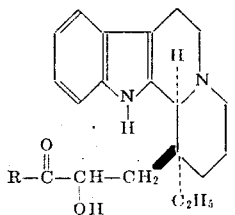

(VII)

wherein R has the same meanings as stated above,
d. the obtained compound of the general formula VII is treated with an oxidizing agent to yield a mixture of compounds of the formulae I and VIII

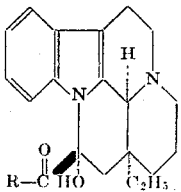

(VIII)

wherein R has the same meanings as stated above, and the compound of the formula VIII is epimerized in a manner known per se into a compound of the formula I.

2. A process for the preparation of compounds of the formula I

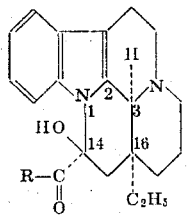

(I)

— wherein

represents an alkoxycarbonyl radical of 2 to 6 carbon atoms or a reactive group convertible into the said alkoxycarbonyl radical, characterized in that
a. 1-ethyl-2,3,4,6,7,12-hexahydroindolo[2,3-a]quinolizine of the formula II

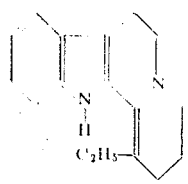

is reacted with an α-acyloxy-acrylic acid derivative of the formual III

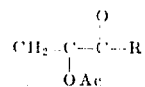

(III)

— wherein R has the same meanings as above and Ac represents an acyl radical,
b. the obtained compound of the general formula IV

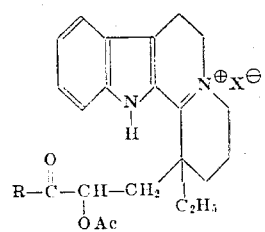

(IV)

wherein R and Ac have the same meanings as above and X⁻ represents an inorganic anion, or the corresponding free base is deacylated,
c. the obtained compound of the general formula VI

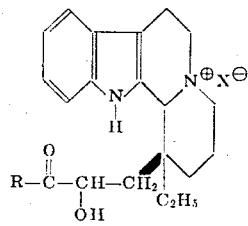

(VI)

wherein R and X⁻ have the same meanings as defined above, is reduced to form a compound of the general formula VII

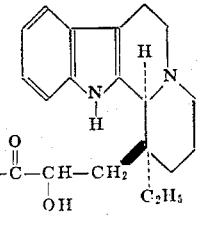
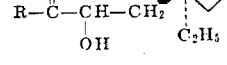

(VII)

wherein R has the meanings as stated above,
d. the obtained compound of the general formula VII is treated with an oxidizing agent to yield a mixture of compounds of the formulae I and VIII

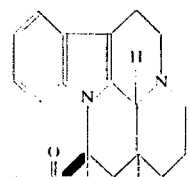

(VIII)

wherein R has the same meanings as stated above, and the compound of the formual is epimerized in a manner known per se into a compound of the formula I.

3. A process as claimed in claim 1, wherein the compound of the formula VII is oxidized with silver carbonate, whereby the formed epimer of the formula VIII is simultaneously epimerized, to yield a compound of the formula I.

4. A process as claimed in claim 2, wherein the compound of the formula VII is oxidized with silver carbonate, whereby the formed epimer of the formula VIII is simultaneously epimerized, to yield a compound of the formula I.

5. A process for the preparation of vincamine, wherein 1-ethyl-2,3,4,6,7,12-hexahydro-12H-indolo[2,3-a]-quinolizine is reacted with α-acetoxy-acrylic acid methyl ester, the obtained 1-(β-acetoxy-β-methoxycarbonyl-ethyl)-1-ethyl-1,2,3,4,6,7-hexahydro-12H-indolo[2,3-a]quinolizine or a salt thereof is reduced and deacylated to yield 1-(β-hydroxy-β-methoxycarbonyl-ethyl)-1-ethyl-1,2,3,4,6,7,12,12b-octahydroindolo[2,3-a]quinolizin, this product or a salt thereof is treated with an oxidizing agent.

6. A process as claimed in claim 5, wherein silver carbonate is used as oxidizing agent and toluene or xylene is used as reaction medium.

* * * * *